United States Patent Office 2,768,192
Patented Oct. 23, 1956

2,768,192

PREPARATION OF ORGANO THIOARSENITES AND ANTIMONITES

Gordon D. McLeod, Lansing, Ill., assignor to Standard Oil Company, Chicago, Ill., a corporation of Indiana No Drawing. Application August 6, 1953,
Serial No. 372,813

10 Claims. (Cl. 260—440)

This invention relates to the preparation of organo thioarsenites and organo thioantimonites and certain uses therefor.

An object of this invention is the preparation of organo thioarsenites and organo thioantimonites. A particular object of the invention is the preparation of alkyl thioarsenites and alkyl thioantimonites. Another object of the invention is a method of killing insects by contacting them with organo thioarsenites or organo thioantimonites. Still another object is a method of stabilizing color of cracked petroleum distillates by adding thereto an organo thioarsenite or organo thioantimonite. A preferred object is the preparation of trialkyl trithioarsenites and trialkyl trithioantimonites. Other objects of the invention will become apparent in the course of the detailed description thereof.

It has been found that organo trithioarsenites and organo trithioantimonites can be prepared by reacting an element selected from the class consisting of arsenic and antimony, with an organic disulfide, in the substantial absence of other organic compounds reactive with arsenic and antimony, at a temperature between about 100° C. and the decomposition temperature of the product trithioarsenite or trithioantimonite.

A wide variety of disulfides may be reacted with arsenic or antimony to produce the corresponding trithioarsenites or thithioantimonites. The hydrocarbon disulfides are particularly suitable for use in this invention. These hydrocarbon disulfides have the general formula

R—S—S—R' wherein R and R' are hydrocarbon groups selected from the class consisting of alkyl, aryl, alkaryl, aralkyl and cycloalkyl. It is to be understood that R and R' may be the same or different groups selected from the above class, i. e., the hydrocarbon disulfide may be symmetrical or unsymmetrical. Examples of these disulfides are di-dodecyl disulfide, methyl hexyl disulfide, di-phenyl disulfide, di-naphthyl disulfide, di-cyclohexyl disulfide and amyl phenyl disulfide.

Particularly suitable are the lower molecular weight dialkyl disulfides, i. e., wherein the alkyl group contains from 1 to 4 carbon atoms. Examples of this class are dimethyl disulfide, methyl ethyl disulfide, diethyl disulfide, di-n-propyl disulfide and ethyl isopropyl disulfide.

In addition to the above disulfides it has been found that a most useful mixture of compounds is obtained by reacting a natural mixture of disulfides. This natural mixture is obtained by extraction of a sour petroleum naphtha with aqueous caustic solution to obtain an aqueous caustic solution containing a mixture of mercaptides; converting these mercaptides to a corresponding mixture of disulfides; and reacting these disulfides with elemental arsenic or antimony according to the procedure of this invention. It is preferred to operate with a mixture of disulfides which is composed substantially of alkyl disulfides such as is obtained by the extraction of a thermally cracked naphtha with aqueous caustic.

The elemental arsenic and elemental antimony should be in a granular form in order to improve the reaction rate. The reaction rate is improved by the use of very fine particles of the arsenic or antimony. It is preferred to use arsenic and antimony in a comminuted state.

Arsenic and antimony are insoluble in organic disulfides even at elevated temperatures. The reaction rate is affected favorably by the degree of agitation of the solid arsenic or antimony and the liquid disulfide.

The reaction between the organic disulfide and arsenic or antimony proceeds very, very slowly at temperatures below about 100° C. The rate of reaction is accelerated by increase in temperature. However, the reaction products are unstable at high temperatures, i. e., crack. The upper limit of useful temperature is dependent upon the type of organo group participating in the reaction. Normally the reaction will be carried out at a temperature which gives a sufficiently short reaction time. In general it is preferred to operate at a temperature between about 175° and 250° C. when aliphatic and aromatic disulfides are used.

The reaction time for substantially complete conversion of the arsenic or antimony may be several days at a temperature of about 100° C. and may be only a few minutes at about 250° C. When operating with aliphatic and aromatic disulfides at temperatures between about 175° and about 250° C., the reaction time may be between about 1 hour and 6 hours, the shorter times corresponding to the higher temperatures. Longer reaction times normally will have little or no adverse effect on the reaction product. Prolonged times, particularly at higher temperatures, should be avoided as these appear to adversely affect the color of the reaction product, even though cracking does not occur.

Ordinary and superatmospheric pressure may be used. Since the disulfide must be in the liquid state, it may be necessary to operate at elevated pressure when the disulfide has a boiling point lower than the reaction temperature. Operation at moderate superatmospheric pressures, e. g., a total pressure of between about 25 and 100 p. s. i. a., is preferred because of a favorable effect on the reaction product yield and color.

The reaction may be carried out in the presence of various hydrocarbon solvents when the operating conditions are suitably adjusted. It appears that hydrocarbon solvents containing readily donatable hydrogen atoms react with the disulfide to form mercaptans; this reaction goes preferentially at atmospheric pressure. Examples of these particular hydrocarbon solvents are n-butylbenzene, ethylbenzene, octylbenzene, actane, decane, petroleum naphthas and kerosene. In the case of hydrocarbon solvents containing readily donatable hydrogen atoms the desired reaction product is obtainable by carrying out the reaction at superatmospheric pressure. The optimum pressure necessary for the particular solvent may be readily determined by a few experiments. To illustrate, when using kerosene as the solvent, excellent yields of the trithioarsenite or trithioantimonite are obtained at an operating pressure of about 25 p. s. i. a.

Other hydrocarbon solvents are utilizable at atmospheric pressures. Examples of these solvents are toluene, xylene, mesitylene, naphthalene, methyl naphthalene, decalin and methyl decalin.

The results obtainable by the use of this invention are illustrated below.

Test 1

The reaction was carried out by the use of a 250 ml. metal reactor provided with a magnetically actuated agitator. The reactor was charged with 25 grams of commercial grade black arsenic and 100 grams of diethyl disulfide, C. P. grade. The reactor was heated to a temperature of 190° C. and maintained at that temperature for 3 hours. The reactor was cooled and the contents withdrawn.

Unreacted arsenic was filtered and weighed. Based on the unreacted arsenic, 80% of the arsenic had undergone reaction. The liquid material was carefully distilled. The material boiling at 90° C. at 1 mm. of Hg was taken as the desired product. This material had an odor slightly less irritating than the diethyl disulfide and a refractive index of 1.607.

The arsenic content of the product fraction was determined by dissolving the fraction in dilute nitric acid. The nitric acid solution was treated with ammonium molybdate to precipitate the ammonium arsenic molybdate. The precipitate was recovered by filtration, dried and weighed. The arsenic content determined by this method was 28 weight percent. The theoretical arsenic content of triethyl trithioarsenite is 29%. Considering the uncertainties in the test procedure for determining arsenic, this is considered a good check.

The sulfur content of the fraction was 38 weight percent. This compares to a theoretical of 37.2%.

*Test 2*

This test was carried out in the apparatus described in Test 1. Herein the disulfides used were derived from a natural mixture of mercaptans obtained by caustic extraction of a cracked naphtha. The natural mixture of mercaptans contained the following mol percentages of alkyl radicals: methyl, 25; ethyl, 45; propyl, 25; and butyl, 5. This natural mixture of disulfides contained a small percentage of petroleum naphtha.

In this test 97 grams of the mixed disulfides and 25 grams of commercial grade black arsenic were maintained at 240° C. for 3 hours. The reactor was cooled and the unreacted arsenic recovered by filtration. About 65% of the arsenic had reacted.

The liquid material was distilled and the fraction boiling between 80° and 95° C. at 1 mm. was taken as the product. This fraction had a refractive index of 1.608, a melting point of about −71° C. and was a pale yellow-green color.

The molecular weight of the mixed disulfides corresponds very closely to that of diethyl disulfide. The product fraction analyzed arsenic about 28% and sulfur, 36.2%; these correspond to a theoretical of about 29% and 37%, respectively.

*Test 3*

In this test 37 grams of commercial black arsenic and 133 grams of n-butyl disulfide were maintained at 200° C. for 5 hours. About 80% of the arsenic reacted. The product fraction boiled at about 115° C. at 0.4 mm. Hg.

This compound was tested for solubility and was found to be very soluble in all the common hydrocarbon solvents such as naphtha, benzene and toluene.

*Test 4*

In this test 69 grams of granular commercial grade antimony and 150 grams of n-butyl disulfide was maintained at 210° C. for 5 hours. The reactor was cooled and the unreacted antimony recovered by filtration. About 70% of the antimony had reacted.

The liquid material was carefully distilled. The product fraction boiled at about 118° C. at 0.5 mm. Hg. This fraction had a refractive index of 1.5985.

The fraction was analyzed for antimony by a technique similar to that described in Test 1. The antimony content of the fraction was about 30 weight percent; the theoretical antimony content of tri-n-butyl trithioantimonite is 31.2 weight percent. The sulfur content of the product fraction was 24% whereas the theoretical is 24.7%.

This compound was soluble in the common hydrocarbon solvents. The compound was insoluble in cold water. It reacted with warm water to form another solid compound.

*Test 5*

The mixed disulfides described in Test 2 were used in this test. Herein 25 grams of powdered antimony and 100 grams of mixed disulfides were maintained at about 215° C. for slightly more than 3 hours. The reactor was cooled and the unreacted antimony recovered by filtration. About 90% of the antimony had reacted.

The liquid material was carefully distilled and the fraction boiling between about 80° and 90° C. at 1 mm. Hg was taken as the product.

The product had a pale straw color and a mild disulfide odor. The refractive index at 20° C. was 1.702. This fraction analyzed about 39% antimony and 31% sulfur. The corresponding theoretical amounts are 40% and 32%, respectively.

This compound was soluble in benzene, naphtha, acetone and concentrated sulfuric acid. It was insoluble in cold water. Two minutes' exposure of a sample of this liquid compound to the atmosphere resulted in the formation of a crust of solid material.

*Test 6*

In this test the triethyl trithioarsenite prepared in Test 1 was tested for toxicity to ordinary houseflies. The triethyl trithioarsenite was dissolved in a stock solution containing 2% lethane, 384 regular as the knockdown agent. The tests were carried out by the Bell Jar method. The results are given below:

| Run | Volume Percent Arsenite in Solution | Percent 24 Hour Kill |
|---|---|---|
| A | None | 22 |
| B | 2 | 100 |
| C | 1 | 100 |
| D | 0.6 | 100 |

These results indicate that triethyl trithioarsenite has excellent toxicity against common houseflies.

*Test 7*

In this test 25 grams of granulated bismuth and 150 grams of mixed disulfides were maintained for 8 hours at 200° C. The reactor was cooled and the unreacted bismuth recovered by filtration. The liquid material was fractionated. This test indicates that any reaction of bismuth and disulfide was substantially within experimental error. It appears that bismuth does not participate in a reaction with disulfide at these conditions.

The trithioarsenites prepared in the various tests above were tested as oxidation inhibitors in cracked petroleum oils. These tests indicated that the trithioarsenites are particularly effective in inhibiting color formation in light gas oils derived from the catalytic cracking of virgin gas oil.

The trithioarsenites and trithioantimonites were tested for reactivity with nitric acid. The trithioarsenites react very violently with 90% nitric acid at room temperature. The reaction is hypergolic, i. e., a visible flame is produced almost instantaneously after contacting the nitric acid and the trithioarsenite. The trithioantimonites are hypergolic with white fuming nitric acid (about 98% acid) at room temperature with an extremely short time lapse between the moment of contacting and the appearance of a visible flame. With 90% nitric acid the trithioantimonites react vigorously but not hypergolically.

A preferred mode of operation is as follows. A slight excess of ethyl disulfide over the theoretical 1.5 mols is charged to a jacketed pressure vessel provided with a motor-driven turbine stirrer. Pulverized commercial grade arsenic is added to the vessel. The ethyl disulfide and the arsenic are vigorously agitated for 1 hour while being maintained at a temperature of 225° C. A pressure sufficient to maintain the diethyl disulfide in the liquid state is utilized. At the completion of the reaction time the contents of the vessel are withdrawn through a filter press wherein the unreacted arsenic is removed. The liquid material is passed to a fractionator wherein the unreacted disulfide is taken overhead and recycled to the reactor. The material boiling at about 90° C. at 1 mm. Hg is withdrawn overhead as product fraction. A slight amount of higher boiling side reaction product is withdrawn from the bottom of the fractionator.

Thus having described the invention, what is claimed is:

1. A process which comprises reacting an element selected from the class consisting of arsenic and antimony with an organic compound of the general formula R—S—S—R wherein R is a hydrocarbon group selected from the class consisting of alkyl, aryl, alkaryl, aralkyl and cycloalkyl, in the substantial absence of other organic compounds reactive with arsenic and antimony, at a temperature between about 175° and about 250° C. for a time between about one hour and six hours, the shorter times corresponding to the higher temperatures and recovering a trithio-product of the element charged to the process.

2. The process of claim 1 wherein said element is arsenic.

3. The process of claim 1 wherein said element is antimony.

4. The process of claim 1 wherein said reaction is carried out at superatmospheric pressure.

5. The process of claim 1 wherein said disulfide is dimethyl disulfide.

6. The process of claim 1 wherein said disulfide is diethyl disulfide.

7. The process of claim 1 wherein said disulfide is dibutyl disulfide.

8. A process which comprises reacting an element from the class consisting of arsenic and antimony with a dialkyldisulfide, in the substantial absence of other organic compounds reactive with said element, at a temperature between about 175° and about 250° C. for a time between about one hour and six hours, the shorter times corresponding to the higher temperatures, using a slight excess of said disulfide over the theoretical 1.5:1 mole ratio of disulfide to said element, and recovering a trialkyltrithio-product of the element reacted.

9. The process of claim 8 wherein said element is arsenic.

10. The process of claim 8 wherein said element is antimony.

References Cited in the file of this patent

Otto: Ber., vol. 10 (1877), pages 939–940.
Lecher: Ber., vol. 53 (1920), pages 582, 588–590.
Lecher: Ber., vol. 48, pages 527, 533.
Dermer: Chemical Reviews, vol. 14, page 392 (1934), 260–429F.
Gilman: Organic Chemistry, vol. I, 2nd edition, page 619.
"Insect Control by Chemicals," by A. W. A. Brown, published in N. Y. C. by John Wiley, 1951, pages 270–276.